Patented Apr. 16, 1935

1,998,211

UNITED STATES PATENT OFFICE 1,998,211

METHOD OF REGENERATING RESITS CONTAINING CELLULOSE FILLING MATERIALS

Johannes van de Ven, Eindhoven, Netherlands, assignor to N. V. Philips' Gloeilampenfabrieken, Eindhoven, Netherlands No Drawing. Application September 23, 1932, Serial No. 634,622. In Germany October 12, 1931

15 Claims. (Cl. 106—22)

My invention relates to a novel process for the regeneration of resits of condensation products of phenolic formaldehyde or like artificial resins, which are in their hardened insoluble and non-fusible final state and which comprise cellulose filler materials, into soluble and fusible resins. By the term "resit" is meant the final condensation product or condensation product "C" of such artificial resins, which as known may pass through three states, referred to as states A, B and C. The material of stage "A", called resol, is liquid or viscous at ordinary temperatures and is soluble in alcohol and similar solvents. The condensation product "B", or "resitol", is no longer liquid but is still to some extent soluble in alcohol, and is plastic when heated. The condensation product "C" or resit, is solid, does not soften when heated, and is insoluble in alcohol.

It is well-known to reconvert substantially pure resits into soluble and fusible resins by treating such resits with a phenol, while subjecting them to heat, with the possible application of pressure, until a product is obtained which may be further resinified with formaldehyde in the presence of a catalyst. However, most of the so called molded or pressed artificial resin articles contain in addition to the resin material also cellulose filling materials as well as the amount of waste occurring at the presses, which waste consists as a rule of resit with a cellulose filler for instance, a phenol-formaldehyde condensation product containing wood-flour.

One object of my invention is therefore to provide a process whereby resits containing cellulose filling materials, for instance the waste at the presses, are reconverted into a mass which can be used for pressing, thus permitting the reclaiming of such waste materials.

A further object of my invention is to decompose resits comprising cellulose fillers, by subjecting them to a treatment with phenol and a hydrolyzing agent for the cellulose under heat and preferably also under pressure, so as to obtain a soluble and fusible artificial resin.

A further object of my invention is to use a mineral acid, for instance hydrochloric acid as such hydrolyzing agent.

A further object of my invention is to further resinify the resins so obtained.

A further object of my invention is to resinify the resins so obtained by a treatment with formaldehyde in the presence of a basic catalyst, for instance ammonia.

A further object of my invention is to obtain this resinifying with a smaller amount of formaldehyde as is required for the complete binding of the phenol added to decompose the resit.

A still further object of my invention is to add a cellulose filler to the mass decomposed and resinified by the above processes, and to thereby obtain a suitable press mass.

Various other objects of my invention will appear as the specification progresses.

According to my invention the mass containing the resit with the cellulose filling material is decomposed by treating it under heat with a phenol and with an agent which hydrolyzes the cellulose. Thereby, resins are obtained which are soluble and fusible and which, after being preferably rinsed with water, may be further transformed, by addition of an aldehyde for instance formaldehyde, and which may be used with or without the addition of filling materials. This further resinifying is preferably carried out in the presence of a basic catalyst, for instance ammonia.

A properly ground mass comprising for instance 750 grs. of resit and triturated insoluble wood-flour, is mixed together in an autoclave, with 400 c. c. of tri-cresol and 1250 c. c. of 10 percent hydrochloric acid. This mixture is heated by gradually increasing the temperature and the pressure. For instance the temperature may be gradually raised to about 165° C. in a time interval of 30 minutes to three hours and the pressure to about 10 atm. The mixture is then cooled down to approximately 100° C. and the hydrochloric acid preferably rinsed out with hot water.

The product thus obtained is a soluble and fusible resin which is viscous at high temperatures, for instance, above 80 to 90° C. and hard at room temperature, it can be compared with the so-called Novolaks. In the above example about 1150 grs. of resin is obtained which is entirely soluble, except for a small residue, in ethyl-alcohol or the like. The yield is thus practically 100 per cent. Evidently the lignin products of the wood-flour have also been converted.

Instead of mixing the phenol and the acid simultaneously with the cellulose containing resit mass, it is also feasible to start out by mixing only the phenol and the resit and adding the hydrolyzing agent after partial heat treatment of the resit with the phenol.

The resin so obtained is subsequently further resinified by subjecting it to heat treatment with an aqueous solution of formaldehyde and preferably with the addition of ammonia so as to make it adapted to be rolled together with wood-flour or another filler to obtain a press mass.

Instead of using formaldehyde and ammonia for the further resinification, the resin may be treated with hexamethylenetetramin, for instance by proceeding as follows:

900 grs. of the resin obtained by the above regenerating process, are mixed with 80 grs. of hexamethylenetetramin and subjected to heat in an open vessel or over a vapour bath for a comparatively short time, (for instance, half an hour). The so heated mass is then cooled down and ground and the product so obtained is mixed with a cellulose filling material for instance, 900 grs. of wood-flour, and thereafter treated in the known manner on rolls.

An important advantage of my invention is also that when the regenerated resin is subjected to further resinification a much smaller amount of formaldehyde or formaldehyde producing materials suffice to resinify it, than would be necessary to bind the whole amount of phenol which has been added for decomposing the resit mass. In fact, it has been found that in many cases addition of as little as one-fourth of the amount of formaldehyde of that which would be required to bind the total amount of the phenol so added is sufficient. This phenomenon is apparently due to the fact that the cellulose of the filling material is converted by hydrolysis into sugars which resinify with the phenol, this reaction being promoted by the presence of the acid.

While I have described certain processes embodying my invention and given specific examples to illustrate same, I do not wish to be limited to the exact processes described and examples given. It should be well understood that not all of the process steps described above need to be applied to practice my invention. For instance, further resinifying of the resit mass may not be required or even if further resinifying is desired, the addition of the cellulose fillers may be dispensed with; also the decomposition may take place without using pressure or the rinsing out of the hydrolyzer may be omitted and various other modifications may take place without deviating from the scope of my invention.

What I claim is:

1. The method of producing an artificial resin from a mass containing resit and a cellulose filling material, comprising the decomposition of said mass by its treatment under heat with a phenol and with a hydrolyzing agent for the cellulose, and subsequently rinsing with water the mass so decomposed.

2. The method of obtaining a soluble artificial resin from a mass containing resit and a cellulose filling material, comprising the decomposition of said mass by its treatment under heat with a phenol and with a mineral acid hydrolyzing the cellulose.

3. The method of obtaining a soluble artificial resin from a mass containing a resit and a cellulose filling material, comprising the decomposition of said mass by treatment under heat with a phenol and with a hydrolyzing agent for the cellulose, said agent consisting of a 10 percent solution of hydrochloric acid.

4. The method of obtaining an artificial resin from a mass containing resit and a cellulose filling material, comprising the decomposition of said mass by its treatment under heat with a phenol and with a hydrolyzing agent for the cellulose, and further resinifying the mass so decomposed by treatment with formaldehyde.

5. The method of obtaining an artificial resin from a mass containing resit and a cellulose filling material, comprising the decomposition of said mass by its treatment under heat with a phenol and a hydrolyzing agent for the cellulose, and further resinifying the mass by its treatment with formaldehyde in the presence of a basic catalyst.

6. The method of obtaining an artificial resin from a mass containing resit and a cellulose filling material, comprising the decomposition of said mass by its treatment under heat with a phenol and a hydrolyzing agent for the cellulose, and further resinifying said mass by its treatment with formaldehyde and ammonia.

7. The method of obtaining an artificial resin from a mass containing resit and a cellulose filling material, comprising the decomposition of said mass by its treatment under heat with a phenol and with a hydrolyzing agent for the cellulose, subjecting the mass so decomposed to rinsing with hot water, and further resinifying said mass with hexamethylenetetramin.

8. The method of obtaining an artificial resin from a mass containing a resit and a cellulose filling material, comprising the decomposition of said mass by simultaneous treatment under heat with a phenol and with an agent which hydrolyzes the cellulose.

9. The method of obtaining an artificial resin from a mass containing resit and a cellulose filling material, comprising the decomposition of said mass by its heat treatment with a phenol and by its treatment with an agent which hydrolyzes the cellulose.

10. The method of obtaining an artificial resin from a mass containing resit with a cellulose filling material, comprising mixing said mass with a phenol and with an agent which hydrolyzes the cellulose under heat, and heating such mixture under pressure.

11. The method of obtaining a soluble artificial resin from a mass containing resit and a cellulose filling material, comprising the decomposition of said mass by its treatment under heat with a phenol and with an agent to hydrolyze the cellulose, adding to said mass formaldehyde in an amount considerably smaller than required for the binding of the total amount of said added phenol, and fully resinifying said mass by its treatment with the formaldehyde.

12. The artificial resin obtained in accordance with the process set forth in claim 1.

13. The artificial resin obtained in accordance with the process set forth in claim 4.

14. The material capable of being molded obtained in accordance with the process set forth in claim 15.

15. The method of obtaining a moldable material from a mass containing a resit and a cellulose filling material, comprising the decomposition of said mass by its treatment under heat with a phenol and with an agent which hydrolyzes the cellulose, rinsing with water the so-decomposed mass, further resinifying said mass with formaldehyde, and adding to the mass a cellulose filler to obtain the moldable material.

JOHANNES van de VEN.